(12) United States Patent
Bao et al.

(10) Patent No.: US 10,105,824 B2
(45) Date of Patent: Oct. 23, 2018

(54) CHEMICAL LEACHING/THERMAL DECOMPOSING CARBONATE IN CARBONATE PCD

(71) Applicant: SMITH INTERNATIONAL, INC., Houston, TX (US)

(72) Inventors: Yahua Bao, Orem, UT (US); J. Daniel Belnap, Lindon, UT (US); Liang Zhao, Spring, TX (US)

(73) Assignee: SMITH INTERNATIONAL, INC., Houston, TX (US)

( * ) Notice: Subject to any disclaimer, the term of this patent is extended or adjusted under 35 U.S.C. 154(b) by 371 days.

(21) Appl. No.: 14/566,039

(22) Filed: Dec. 10, 2014

(65) Prior Publication Data

US 2015/0183091 A1    Jul. 2, 2015

Related U.S. Application Data

(60) Provisional application No. 61/922,054, filed on Dec. 30, 2013.

(51) Int. Cl.
| | |
|---|---|
| *B24D 18/00* | (2006.01) |
| *B01J 3/06* | (2006.01) |
| *C04B 35/52* | (2006.01) |
| *C04B 35/645* | (2006.01) |
| *C22C 26/00* | (2006.01) |
| *B22F 3/24* | (2006.01) |
| *B22F 5/00* | (2006.01) |

(52) U.S. Cl.
CPC .............. *B24D 18/00* (2013.01); *B01J 3/062* (2013.01); *C04B 35/52* (2013.01); *C04B 35/645* (2013.01); *C22C 26/00* (2013.01); *B01J 2203/062* (2013.01); *B01J 2203/064* (2013.01); *B01J 2203/0655* (2013.01); *B01J 2203/0685* (2013.01); *B22F 2003/244* (2013.01); *B22F 2003/248* (2013.01); *B22F 2005/001* (2013.01); *B22F 2999/00* (2013.01); *C04B 2235/3206* (2013.01); *C04B 2235/427* (2013.01); *C04B 2235/442* (2013.01)

(58) Field of Classification Search
CPC .. B24D 18/00; B01J 3/00; B01J 3/062; C04B 35/52; C04B 35/645; C09K 3/14; E21B 10/00; E21B 10/46; E21B 10/55; B23B 27/14; B23B 27/20; C23F 1/00; C01B 31/06; B22F 2003/244; B22F 3/1146
See application file for complete search history.

(56) References Cited

U.S. PATENT DOCUMENTS

| | | | |
|---|---|---|---|
| 7,845,438 | B1 | 12/2010 | Vail et al. |
| 8,002,859 | B2 | 8/2011 | Griffo et al. |
| 9,539,703 | B2 | 1/2017 | Bao |
| 9,539,704 | B2 | 1/2017 | Bao |

(Continued)

OTHER PUBLICATIONS

International Search Report and Written Opinion issued in PCT/US2014/070281 dated Apr. 14, 2015, 14 pages.

(Continued)

*Primary Examiner* — Jennifer A Smith
*Assistant Examiner* — Alexandra M Moore (57) ABSTRACT

A method for treating a polycrystalline diamond material includes subjecting the polycrystalline diamond material to a leaching process and to a thermal decomposition process.

18 Claims, 4 Drawing Sheets

(56) References Cited

U.S. PATENT DOCUMENTS

| | | | |
|---|---|---|---|
| 2006/0060390 A1* | 3/2006 | Eyre | C22C 26/00 |
| | | | 175/432 |
| 2009/0152018 A1* | 6/2009 | Sani | B21C 3/02 |
| | | | 175/432 |
| 2010/0095602 A1 | 4/2010 | Belnap et al. | |
| 2011/0023375 A1 | 2/2011 | Sani et al. | |
| 2012/0241224 A1 | 9/2012 | Qian et al. | |
| 2013/0001100 A1 | 1/2013 | Thigpen et al. | |
| 2013/0248258 A1* | 9/2013 | Bellin | E21B 10/00 |
| | | | 175/428 |

OTHER PUBLICATIONS

International Preliminary Report on Patentability issued in International Patent application PCT/US2014/070281, dated Jul. 14, 2016. 10 pages.
First Office Action and Search Report issued in Chinese patent application 201480075557.X dated May 3, 2017. 16 pages.
Second Office Action issued in Chinese patent application 201480075557.X dated Dec. 26, 2017. 8 pages.

* cited by examiner

CHEMICAL LEACHING/THERMAL DECOMPOSING CARBONATE IN CARBONATE PCD

CROSS-REFERENCE TO RELATED APPLICATIONS

This application claims the benefit of U.S. Provisional Application No. 61/922,054, filed 30 Dec. 2013.

BACKGROUND

Ultra-hard materials are often used in cutting tools and rock drilling tools. Polycrystalline diamond material is one such ultra-hard material, and is known for its good wear resistance and hardness. To form polycrystalline diamond, diamond particles are sintered at high pressure and high temperature (HPHT sintering) to produce an ultra-hard polycrystalline structure. A catalyst material is added to the diamond particle mixture prior to HPHT sintering and/or infiltrates the diamond particle mixture during HPHT sintering in order to promote the intergrowth of the diamond crystals during HPHT sintering, to form the polycrystalline diamond (PCD) structure. Metals conventionally employed as the catalyst include solvent metal catalysts such as Group VIII elements of the Periodic table, including cobalt, iron, and nickel, and combinations and alloys thereof. After HPHT sintering, the resulting PCD structure includes a network of interconnected diamond crystals or grains bonded to each other, with the catalyst material occupying the interstitial spaces or pores between the bonded diamond crystals. The diamond particle mixture may be HPHT sintered in the presence of a substrate, to form a PCD compact bonded to the substrate. The substrate may also act as a source of the metal catalyst that infiltrates into the diamond particle mixture during sintering.

The amount of catalyst material used to form the PCD body represents a compromise between desired properties of strength, toughness, and impact resistance versus hardness, wear resistance, and thermal stability. While a higher metal catalyst content generally increases the strength, toughness, and impact resistance of the resulting PCD body, this higher metal catalyst content also decreases the hardness and wear resistance as well as the thermal stability of the PCD body. This trade-off makes it difficult to provide a PCD having desired levels of hardness, wear resistance, thermal stability, strength, impact resistance, and toughness to meet the service demands of particular applications, such as in cutting and/or wear elements used in subterranean drilling devices.

Thermal stability can be particularly relevant during wear or cutting operations. Conventional PCD bodies may be vulnerable to thermal degradation when exposed to elevated temperatures during cutting and/or wear applications. This vulnerability results from the differential that exists between the thermal expansion characteristics of the metal catalyst disposed interstitially within the PCD body and the thermal expansion characteristics of the intercrystalline bonded diamond. This differential thermal expansion is known to start at temperatures as low as 400° C., and can induce thermal stresses that are detrimental to the intercrystalline bonding of diamond and that eventually result in the formation of cracks that can make the PCD structure vulnerable to failure. Accordingly, such behavior is not desirable.

Another form of thermal degradation known to exist with conventional PCD materials is one that is also related to the presence of the metal catalyst in the interstitial regions of the PCD body and the adherence of the metal catalyst to the diamond crystals. Specifically, metal catalyst is known to cause an undesired catalyzed phase transformation in diamond (converting it to carbon monoxide, carbon dioxide, or graphite) with increasing temperature, thereby limiting the temperatures at which the PCD body may be used.

To improve the thermal stability of the PCD material, a carbonate catalyst has been used to form the PCD. PCD formed with a carbonate catalyst is referred to hereinafter as "carbonate PCD." The carbonate catalyst is mixed with the diamond particles prior to sintering, and promotes the growth of diamond grains during sintering. When a carbonate catalyst is used, the diamond remains stable in polycrystalline diamond form with increasing temperature, rather than being converted to carbon dioxide, carbon monoxide, or graphite. Thus the carbonate PCD is more thermally stable than PCD formed with a metal catalyst.

However, the carbonate catalyst itself is subject to a decomposition reaction with increasing temperature, converting to a metal oxide. Specifically, the carbonate decomposes to CO or $CO_2$ gas, causing outgassing of the carbonate PCD material when heated at temperatures greater than 400° C. This outgassing can cause volume expansion and undesirable voids, bubbles, or films on adjacent surfaces, leading to imperfections and cracks in the ultra-hard material as well as decreased wear resistance.

Moreover, when the decomposed gas cannot be quickly released from the carbonate PCD layer, cracks may be formed in the carbonate PCD layer. In order to quickly release thermally generated gas, it is better to have large pore size distribution inside the carbonate PCD layer. However, large pore size distribution in the carbonate PCD layer will deteriorate the carbonate PCD wear resistance due to a decrease amount of diamond volume. If the carbonate PCD layer is closely-packed with a small pore distribution (e.g., PCD with less than 5 wt % premixed carbonate), it becomes difficult to avoid internal thermal cracks.

SUMMARY

The summary is provided to introduce a selection of concepts that are further described below in the detailed description. This summary is not intended to identify key or essential features of the claimed subject matter, nor is it intended to be used as an aid in limiting the scope of the claimed subject matter.

In an embodiment, a method for treating a polycrystalline diamond material is provided. The method includes obtaining the polycrystalline diamond material including bonded crystals with carbonate catalyst material in interstitial spaces between the crystals, subjecting the polycrystalline diamond material to a leaching process or a thermal decomposition process, and subsequently subjecting the polycrystalline diamond material to the other of the leaching process or the thermal decomposition process. In some embodiments, subjecting the polycrystalline diamond to the thermal decomposition process includes subjecting the polycrystalline diamond material to a temperature of at least 400° C. In some embodiments, subjecting the polycrystalline diamond material to the leaching process includes exposing the polycrystalline diamond material to an acid.

In a further embodiment, a method for treating a polycrystalline diamond material is provided including obtaining polycrystalline diamond material including bonded crystals with carbonate catalyst material in interstitial spaces between the crystals, and simultaneously subjecting the polycrystalline diamond material to a leaching process and a thermal decomposition process. In one embodiment, subjecting the polycrystalline diamond to the thermal decomposition process includes subjecting the polycrystalline diamond material to a temperature of at least 400° C. In another embodiment, subjecting the polycrystalline diamond material to the leaching process includes exposing the polycrystalline diamond material to an acid.

DETAILED DESCRIPTION

The present disclosure relates to ultra-hard materials, and more particularly, to ultra-hard materials formed with a carbonate catalyst that are leached and thermally decomposed, and to methods of forming the same. For clarity, as used herein, the term "PCD" refers to conventional polycrystalline diamond that has been formed with the use of a metal catalyst during an HPHT sintering process, forming a microstructure of bonded diamond crystals with the catalyst material occupying the interstitial spaces or pores between the bonded diamond crystals. The term "carbonate PCD" refers to PCD formed with a carbonate catalyst, forming a microstructure of bonded diamond crystals with the carbonate catalyst material occupying the interstitial spaces or pores between the bonded diamond crystals.

Figure 1:
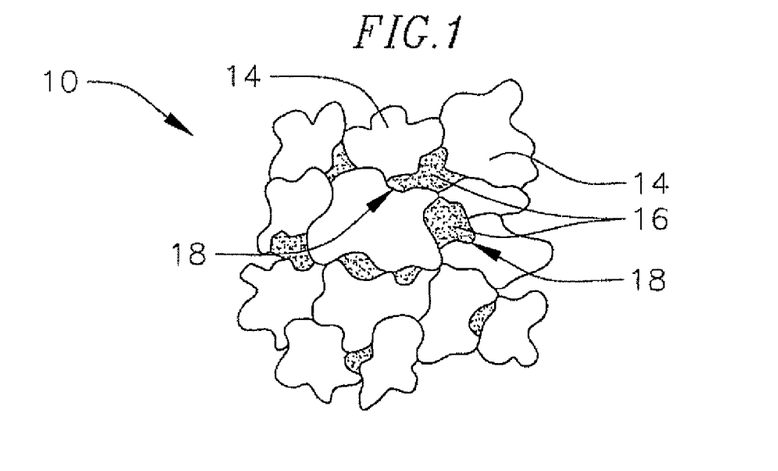
FIG. 1 illustrates a schematic view of a material microstructure of a carbonate polycrystalline diamond material according to an embodiment (dimensions are exaggerated and are not necessarily to scale).

A region of a carbonate PCD material 10 is schematically illustrated in FIG. 1. The carbonate PCD material 10 has a polycrystalline microstructure including multiple diamond grains or crystals 14 bonded to each other, with interstitial spaces or pores 18 between the diamond crystals. This polycrystalline microstructure is formed by subjecting diamond particles to an HPHT sintering process in the presence of a carbonate catalyst. In one embodiment, the HPHT sintering process includes applying a pressure of about 70 kbar or greater, and a temperature of greater than 2000° C. In another embodiment, the HPHT sintering process includes applying a pressure of about 65 kbar or greater, and a temperature of greater than 1800° C. At this temperature and pressure, the carbonate catalyst material melts and infiltrates the diamond particle mixture. The catalyst promotes the direct bonding of diamond crystals during the HPHT sintering process, forming carbonate PCD. The result is a carbonate PCD material with the carbonate catalyst material 16 occupying the interstitial spaces 18 between the diamond grains 14. In one embodiment, the diamond grains 14 in the carbonate PCD material are about 1 to 20 microns in size.

Figure 2:
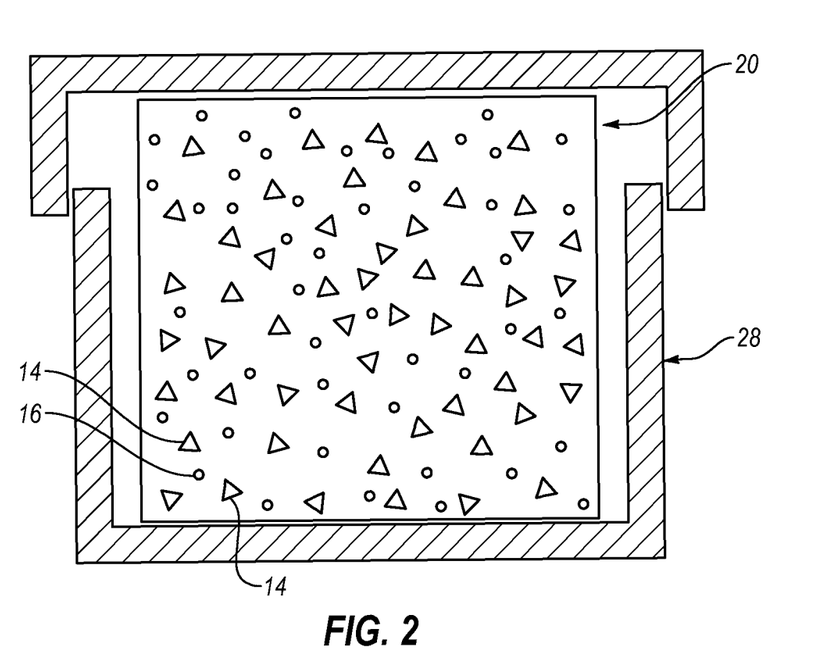
FIG. 2 is a cross-sectional view of a high pressure high temperature sintering enclosure with diamond particles and carbonate PCD.

In one embodiment, a carbonate PCD body is formed by subjecting a volume of ultra-hard material particles such as a volume of diamond particles to a HPHT sintering process in the presence of a carbonate catalyst such as magnesium carbonate ($MgCO_3$), also referred to as Magnesite. In an embodiment as shown in FIG. 2, the carbonate PCD body 20 is formed by mixing diamond particles 14 with the carbonate catalyst 16, placing them in a sintering enclosure 28 made from a refractory material, such as for example, niobium or molybdenum, and HPHT sintering to create the carbonate PCD body. In an embodiment, the diamond particles with the carbonate catalyst are HPHT sintered adjacent a substrate, as for example a tungsten carbide substrate, to form a carbonate PCD body attached to the substrate. In such embodiments, the carbonate PCD body may be separated from the substrate prior to heat-treatment and/or leaching processing described below.

The formed carbonate PCD body 20 in one embodiment is subsequently heat-treated under vacuum or at atmospheric pressure at a temperature of approximately 400° C. to 1300° C. to convert a portion of the carbonate catalyst into an oxide, while releasing a gas. In embodiments including an $MgCO_3$ carbonate catalyst, the oxide is magnesium oxide (MgO), and the gas is carbon dioxide ($CO_2$).

Generally, when a non-metal catalyst such as a carbonate is used in forming a carbonate PCD body, the diamond remains stable while being converted to polycrystalline diamond form during HPHT sintering with increased temperatures (e.g., up to 1300° C.), without being converted to carbon dioxide, carbon monoxide, or graphite. However, during subsequent heat-treatment cycles of the formed carbonate PCD under atmospheric pressure or vacuum (after HPHT sintering) for the purpose of decomposing the carbonate catalyst, the PCD may develop cracks at temperatures between 500° C. and 1300° C., and may be subject to graphitization (for example, where heat treatment alone is used to remove the carbonate). The threshold temperature of 1300° C. is close to the thermally stable temperature of PCD under vacuum.

In an effort to expeditiously partially or fully remove the carbonate catalyst from the carbonate PCD body, chemical leaching and thermal decomposition may be combined. Leaching can substantially or totally remove the carbonate, for example the $MgCO_3$, residue from the interstitial spaces. Such leaching can take in excess of 14 days. In one embodiment, the carbonate PCD body can be partially thermally decomposed at low temperatures, for example temperatures of 400° C. or greater, or temperatures in the range of 400° C. to 1300° C. for periods of time in the range of several minutes to 10 days, and then leached with a leaching material such as acid, or the carbonate PCD layer may be partially leached and then thermally decomposed at low temperatures of 400° C. or greater. The process of thermally decomposing a leached carbonate PCD or leaching a thermally decomposed carbonate PCD can be repeated for several cycles of leaching and thermally decomposing, e.g., at least 1-20 cycles, and in some embodiments, at least 2-10 cycles, and in some embodiments, at least 4-8 cycles, however, any suitable number of cycles may be used and the number of cycles may depend on a number of factors including leaching/decomposition time, size of the carbonate PCD, depth of desired catalyst removal, etc. Leaching acids that can be used for leaching the magnesium carbonate catalyst from the carbonate PCD include hydrochloric acid, sulfuric acid, citric acid, other acid solutions that are capable of reacting with the carbonate to form a soluble oxide and $CO_2$, or other solutions that are capable of removing the carbonate. In one embodiment, acids with high boiling points are used as they allow for leaching at a higher temperature resulting in faster leaching times. If an acid with a lower boiling point is used, the leaching may take place in a pressure vessel, thus allowing for heating above the acid boiling point and speeding up the leaching process times. In one embodiment, hydrofluoric and nitric acids which have a boiling point less than 100° C. may be used for leaching the carbonate PCD.

Since there is oxide, e.g., MgO, residue after thermal decomposition, the pores inside the carbonate PCD body are partially occupied by the MgO. As such, the pores tend to be narrow. Consequently, it is harder to quickly release the generated CO and $CO_2$ gases which may be trapped in the pores and it is therefore difficult to avoid thermal cracks after heat treatment for thermal decomposition. However, leaching helps remove the MgO residue, thus opening up the narrowed pores. In an effort to chemically leach the carbonate at a higher rate or at the highest possible rate so as to prevent the build-up of CO and $CO_2$ gases in the carbonate PCD body and the consequential formation of cracking, in one embodiment, a pressure vessel containing a leaching solution, such as a leaching acid is used. Use of a pressure vessel for leaching a PCD is known to those of ordinary skill in the art, for example, see U.S. Pat. No. 8,002,859.

Figure 3:
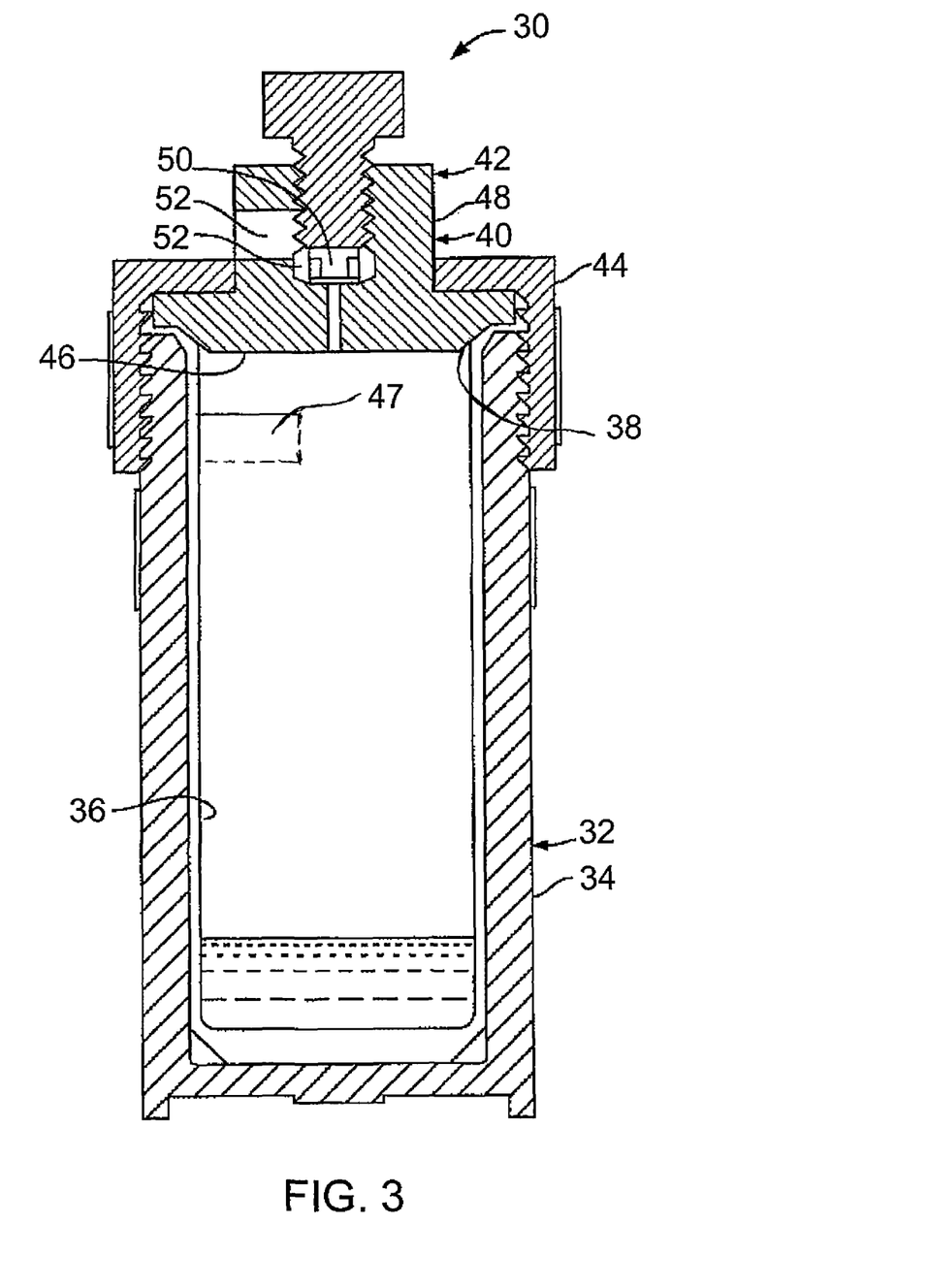
FIG. 3 is a cross-sectional view of a pressure vessel which may be used for leaching.

Referring to FIG. 3, a pressure vessel according to an embodiment of the present disclosure is shown. Pressure vessel 30 includes a container body 32 (which may have two parts, body 34 and liner 36) having an opening 38 at the top end thereof. Container body 32 is closed by closure 40, which includes closure portion 42 and holding collar 44 which threadably engages with body 34. Closure portion 42 includes sealing section 46 and boss 48. Body 34 is made of a material having sufficient strength (tensile strength) and other physical characteristics, including dimensions, so that it can withstand internal pressures in ranges likely to be encountered in various heating and digestion operations in which the container may be employed. Such pressure ranges may range, for example, up to 5000 psi. However, a vent 50 may be provided for the pressure vessel 30 so that if pressures generated within the pressure vessel 30 exceed the limits for which the container is designed, the generated pressures will vent from the container to the external environment. The vent 50 may include a rupturable diaphragm (not shown separately), which under normal pressures seals the interior of the pressure vessel 30 from the passageways 52 leading to an exterior environment. Most suitable synthetic organic polymeric plastic materials for such container body 32 are any of the polyether imides, such as those sold under the ULTEM® trademark by General Electric Corporation, but others of the "engineering plastics," fiber reinforced plastics, such as glass fiber reinforced polyesters or polyethers, or other polymers known to be of good strength and/or transmissive of microwaves (when microwave heating is used) may also be used. Further, one skilled in the art would appreciate that any configuration of a sealed, but ventable container may be used for forming a pressure vessel, such as the one shown in FIG. 3, and may be used to leach polycrystalline diamond bodies in accordance with the present disclosure. Other types of leaching pressure vessels may also be used.

The chemical reaction of magnesium carbonate and a leaching acid during leaching, such as the chemical reaction of magnesium carbonate and hydrochloric acid or magnesium carbonate and sulfuric acid, creates carbon dioxide. More specifically, the reaction between magnesium carbonate and hydrochloric acid results in magnesium chloride, water, and carbon dioxide ($MgCl_2$, $H_2O$, and $CO_2$), whereas the reaction between magnesium carbonate and sulfuric acid results in magnesium sulfate, water, and carbon dioxide ($MgSO_4$, $H_2O$, and $CO_2$). If the carbon dioxide is confined in a pressure vessel such as the pressure vessel 30, it will cause an excessive increase in the internal pressure of vessel, and as a result, decrease the leaching reaction rate as the reaction proceeds and furthermore, may damage or cause safety concerns with the pressure vessel. In an embodiment, agents may be used that are capable of adsorbing/absorbing the carbon dioxide. Another option is to physically vent the pressure vessel above a certain pressure level. A possible disadvantage with venting is that it may reduce the heat during the leaching process, and thus, slow the leaching process. Examples of agents that can absorb carbon dioxide are alkanoamine and/or ionic liquid based absorbents. Examples of agents that are known as adsorbing agents for carbon dioxide are zeolites, ordered mesoporous silica compositions, metal-organic frameworks (MOFs), carbonaceous materials, for example graphene and/or carbon nanotubes, amine based materials, lithium based materials, and/or calcium. These agents capable of adsorbing or absorbing carbon dioxide may be placed in the vessel during leaching. In one embodiment, at least one of these agents is placed within the vessel at an area where the carbon dioxide collects, as for example an upper area in the vessel away from the leaching acid. For example, a shelf 47 may be provided in the pressure vessel to hold the agents.

During leaching, the leaching acid may be heated above 100° C. to speed the reaction rate. Another way to speed up the leaching rate is to the leach the carbonate PCD at a higher temperature. In one embodiment, the leaching occurs at temperatures greater than 160° C. and in another embodiment at temperatures in the range of 160° C. to 170° C. A further option may be to leach the carbonate PCD under a vacuum. Moreover, since carbon dioxide gas is generated with a reaction between the acid and the magnesium carbonate, in one embodiment, the carbon dioxide gas is removed out of the PCD body as soon as it is formed or soon after it is formed. If carbon dioxide gas is trapped in the pores of the PCD body, it would block the channels for the acid solutions to diffuse in for further reaction between the acid and the carbonate. By applying a vacuum (e.g., in an embodiment when leaching without a pressure vessel), the vacuum can speed up the removal of the generated $CO_2$ gas out of the PCD pore channels. An example vacuum may be in the order of $10^{-1}$ bar to $10^{-7}$ bar. In this regard, the leaching rate can be further improved.

After leaching, the amount of the carbonate catalyst and oxide, for example MgO, in the pores is reduced or completely removed. If reduced, the carbonate PCD body with reduced oxide in its interstitial spaces is then subjected to a heat treatment process to further decompose the carbonate catalyst. The carbonate PCD body may then be subjected to further leaching and possibly further heat treatment until a desired amount of the carbonate catalyst has been removed from a desired section of the carbonate PCD body or from the entire carbonate PCD body. In some embodiments, the resulting PCD has improved wear resistance.

As discussed, the carbonate PCD may be leached first and then subjected to heat treatment process for thermal decomposition. The alternating leaching and heating processes may be repeated until a sufficient amount of the carbonate catalyst has been removed from a desired portion of the carbonate PCD. Similarly, as discussed, the carbonate PCD may be first exposed to heat treatment process for thermal deposition followed by a leaching process. Again, the alternating heat treatment and leaching process may be repeated, e.g., they may be repeated many times, for achieving the desired removal of the carbonate catalyst through an appropriate portion of the carbonate PCD. For example, an appropriate portion may be a desired depth of the carbonate PCD or may be the entire carbonate PCD.

Figure 4:
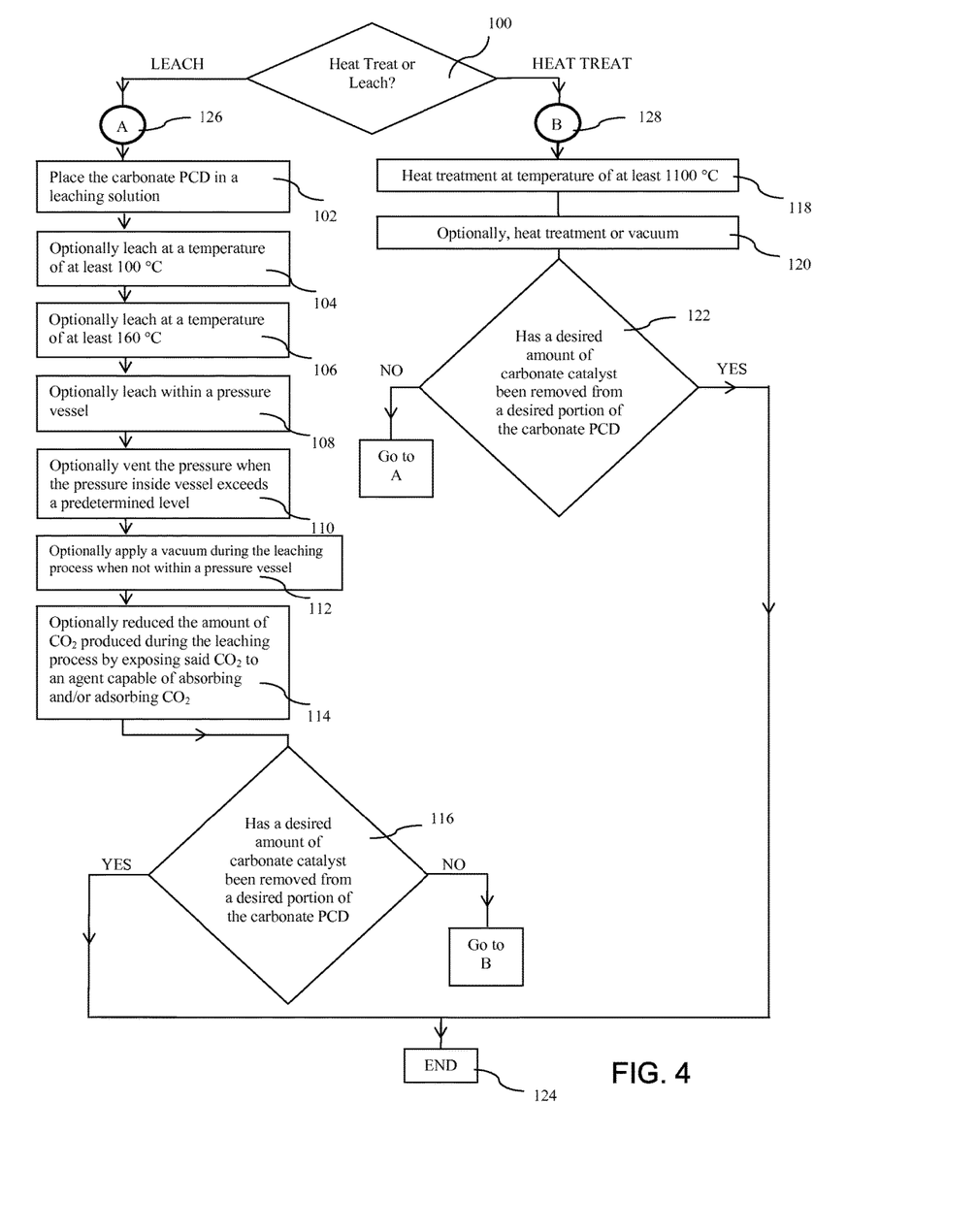
FIG. 4 is a flow chart of a method for removing carbonate from a carbonate PCD according to an embodiment.

An example process is shown in FIG. 4. First a decision is made whether to leach or heat treat first (block 100). If leaching is to occur first, the carbonate PCD is placed in the leaching solution (block 102). Optionally, the leaching may occur at a temperature of at least 100° C. (block 104) or at a temperature of at least 160° C. (block 106). Optionally, the leaching can occur within a pressure vessel (block 108). Optionally, the pressure vessel may be vented when the pressure inside the vessel exceeds a predetermined or set level (block 110). Optionally, a vacuum may be applied during the leaching process when not in a vessel (block 112). Optionally, the amount of $CO_2$ produced during the leaching process may be reduced by exposing the $CO_2$ to a chemical or a material capable of absorbing and/or adsorbing $CO_2$ (block 114). If a desired amount of carbonate catalyst has been removed from a desired portion or section of the carbonate PCD (block 116), the process is ended (block 124). If a desired amount of carbonate catalyst has not been removed, then the carbonate PCD is exposed to a heat treatment process at a temperature of at least 1100° C. (block 118). Optionally, the heat treatment can occur in a vacuum (e.g., a reduced pressure) (block 120). If the desired amount of the carbonate catalyst has now been removed from the desired portion of the carbonate PCD (block 122), the process is ended (block 124). If a desired amount of carbonate catalyst has not been removed, a leaching process is repeated by starting at block 126. If after the subsequent leaching process, a sufficient amount of carbonate catalyst has not been removed, the heat treatment process is repeated from block 128. In another embodiment, the heat treatment process and the leaching process may occur simultaneously.

The leaching process may be varied. Moreover, the heat treatment process may also be varied. For example, the parameters of the leaching process may be individually selected each time the carbonate PCD is subjected to the leaching process after the heat treatment process (e.g., leaching agents, temperature, pressure, time, etc.). Similarly, the parameters of the heat treatment process may be individually selected each time the carbonate PCD is subjected to heat treatment process after being subjected to a leaching process (e.g., temperature, time, etc.). For example, the carbonate PCD may be subjected to a first leaching process at a first temperature and then to a heat treatment process, and then to a second leaching process at a second temperature that is different than the first temperature. In another embodiment, the carbonate PCD may be subjected to a leaching process using an agent for adsorbing carbon dioxide and then subjected to the second leaching process using an absorbing agent for absorbing carbon dioxide that is different than the adsorbing agent that was used in the first leaching process. Similarly, the carbonate PCD may be subjected to a heat treatment process at a first temperature and then subjected to leaching process, and then subjected to a second heat treatment process at a second temperature that is different from the first temperature of the first heat treatment process. For a carbonate PCD having a thickness that generally necessitates 14 days or longer to leach the carbonate catalyst from the carbonate PCD using leaching alone, by leaching in combination with heat treating according to some embodiments, it may take less than 10 days to remove the carbonate catalyst form the carbonate PCD.

Use of other materials in the pressure vessels or vessels made from other materials may allow for an increase in temperature which has the capability to further increase the reaction rate. For example, standard pressure vessels made with stainless steel and using hydrochloric acid are generally used at maximum temperatures of 250-300° C. By using pressure vessels incorporating tantalum or tantalum-based coatings such as manufactured by Tantaline, Inc., the temperature can be increased into the range of 300-350° C. Further increases in temperature are possible by using graphite-based pressure containers, such as those manufactured by Mersen, Inc., which can be operated in the range 350-450° C. Additionally, temperatures above 450° C. may be possible with vessels employing fused quartz or borosilicate glass into the acid containment. From a reaction rate perspective, the higher temperatures are highly desirable as reaction kinetics are generally exponentially dependent on temperature. Temperatures of greater than 400° C. are additionally desirable since these can potentially employ mechanisms of both chemical decomposition and thermal decomposition to achieve even faster reaction kinetics. In the case where this dual decomposition is achieved, it may be advantageous to employ suitable carbon dioxide absorbing or adsorbing materials as discussed herein to avoid the buildup of pressure which could lead to suppression of the reaction rate and/or safety concerns with the pressure vessel.

Moreover, in some embodiments, leaching using a leaching acid in an ultrasonic bath also improves the leaching rate.

Although some embodiments have been described in detail above, those skilled in the art will readily appreciate that many modifications are possible in the embodiments without materially departing from this disclosure. Accordingly, all such modifications are intended to be included within the scope of this disclosure. It is the express intention of the applicant not to invoke 35 U.S.C. 112, paragraph 6 for any limitations of any of the claims herein, except for those in which the claim expressly uses the words 'means for' together with an associated function.

What is claimed is:

1. A method for treating a polycrystalline diamond material comprising bonded crystals with a carbonate catalyst material in interstitial spaces between the crystals, the method comprising:
   subjecting said polycrystalline diamond material to a cycle, said cycle comprising subjecting the polycrystalline diamond material to a first process, said first process being a leaching process or a thermal decomposition process, said thermal decomposition process comprising subjecting said polycrystalline diamond material to a temperature of at least 400° C.;
   subsequently subjecting the polycrystalline diamond material to a second process, said second process being the other of the leaching process or the thermal decomposition process, said first and second processes resulting in removing a portion of a carbonate catalyst material from said polycrystalline diamond material extending from an outer surface of said polycrystalline diamond material to a first depth into said polycrystalline diamond material; and
   subjecting said polycrystalline diamond material to another of said cycle; removing another portion of the carbonate catalyst material; and
   subsequently subjecting said polycrystalline diamond material to one or more of said cycle as necessary until the carbonate catalyst material has been removed from the outer surface of said polycrystalline diamond material to a desired depth deeper than the first depth.

2. The method as recited in claim 1 wherein subjecting the polycrystalline diamond material to the leaching process comprises exposing the polycrystalline diamond material to an acid.

3. The method as recited in claim 2 wherein subjecting the polycrystalline diamond material to the leaching process comprises subjecting the polycrystalline diamond material to the acid while in a pressure vessel.

4. The method as recited in claim 3 wherein subjecting the polycrystalline diamond material to the leaching process comprises including at least one agent in the pressure vessel capable of at least one of absorbing or adsorbing carbon dioxide.

5. The method as recited in claim 3 wherein subjecting the polycrystalline diamond material to the leaching process comprises venting the pressure vessel.

6. The method as recited in claim 3 wherein the pressure vessel comprises tantalum.

7. The method as recited in claim 3 wherein the pressure vessel comprises a coating comprising tantalum.

8. The method as recited in claim 3 wherein the pressure vessel is made of a material comprising graphite.

9. The method as recited in claim 1 wherein subjecting the polycrystalline diamond material to a leaching process comprises subjecting the polycrystalline diamond material to a leaching ultrasonic bath.

10. A method for treating a polycrystalline diamond material comprising:
    simultaneously subjecting the polycrystalline diamond material to a leaching process and a thermal decomposition process, the polycrystalline diamond material comprising bonded crystals with carbonate catalyst material in interstitial spaces between the crystals,
    wherein the thermal decomposition process comprises subjecting the polycrystalline diamond material to a temperature of at least 400° C., and
    repeating said simultaneous leaching and thermal decomposition processes.

11. The method as recited in claim 10 wherein subjecting the polycrystalline diamond material to the leaching process comprises exposing the polycrystalline diamond material to an acid.

12. The method as recited in claim 11 wherein subjecting the polycrystalline diamond material to the leaching process comprises subjecting the polycrystalline diamond material to the acid while in a pressure vessel.

13. The method as recited in claim 12 wherein subjecting the polycrystalline diamond material to the leaching process comprises including at least one agent in the pressure vessel capable of at least one of absorbing or adsorbing carbon dioxide.

14. The method as recited in claim 12 wherein subjecting the polycrystalline diamond material to the leaching process comprises venting the pressure vessel.

15. The method as recited in claim 12 wherein the pressure vessel comprises tantalum.

16. The method as recited in claim 12 wherein the pressure vessel is made of a material comprising graphite.

17. The method as recited in claim 10 wherein subjecting the polycrystalline diamond material to a leaching process comprises subjecting the polycrystalline diamond material to a leaching ultrasonic bath.

18. A method for treating a polycrystalline diamond material comprising:
    subjecting the polycrystalline diamond material to a thermal decomposition process by subjecting said polycrystalline diamond material to a temperature of at least 400° C., the polycrystalline diamond material comprising bonded crystals with carbonate catalyst material in interstitial spaces between the crystals;
    subsequently subjecting the polycrystalline diamond material to a leaching process; and
    subsequently subjecting the polycrystalline diamond material to another thermal decomposition process by subjecting said polycrystalline diamond material to a temperature of at least 400° C. after subjecting said polycrystalline diamond material to said leaching process.

* * * * *